J. E. HASCHKE.
BOAT STEERING AND PROPELLING DEVICE.
APPLICATION FILED JULY 17, 1911.
1,021,408.
Patented Mar. 26, 1912.
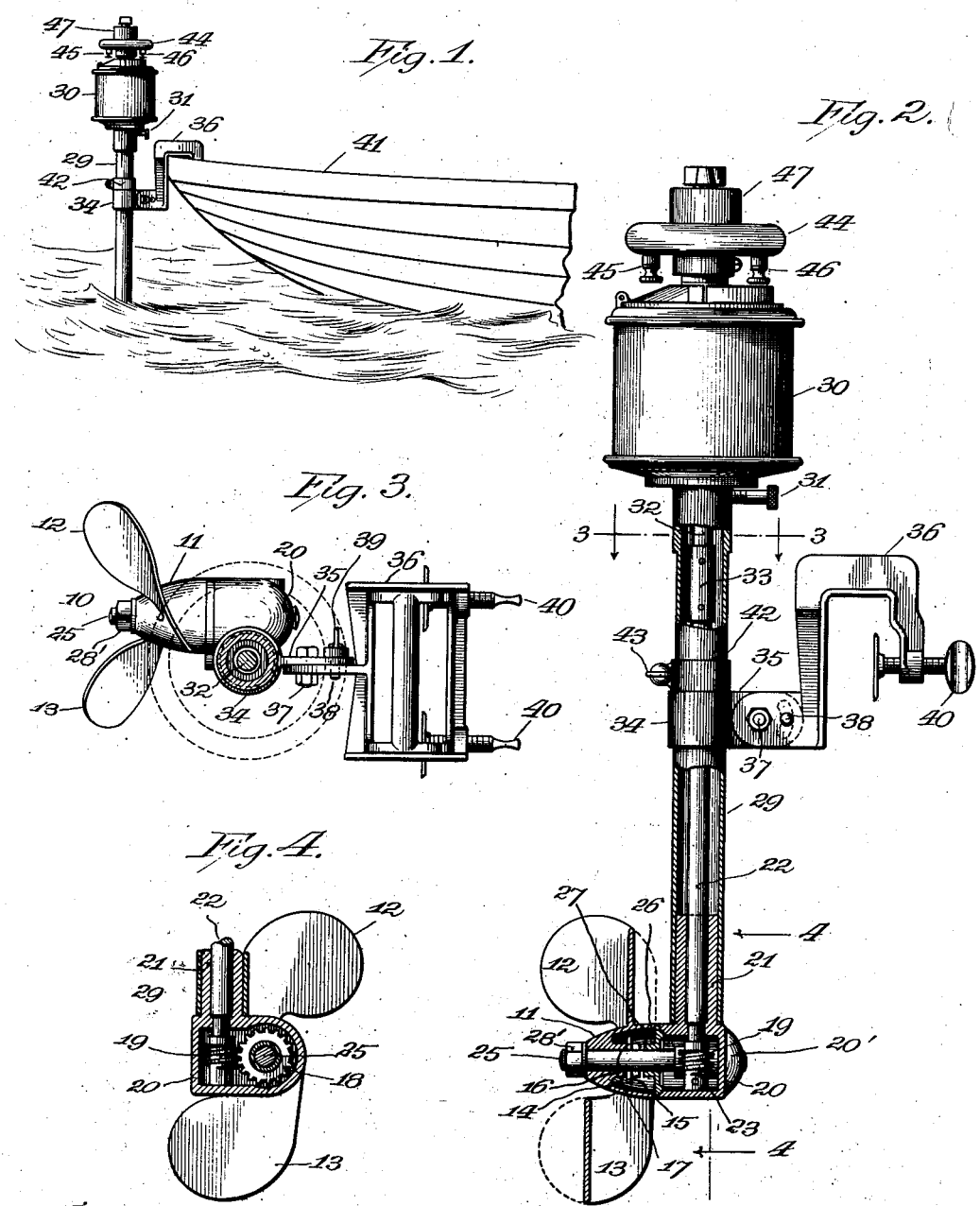
Witnesses:
Robert N. Weir
A. H. Raising
Inventor:
Julius E. Haschke
by Foree Bain May
Attys.

UNITED STATES PATENT OFFICE.

JULIUS E. HASCHKE, OF CHICAGO, ILLINOIS, ASSIGNOR TO JEWEL ELECTRIC CO., OF CHICAGO, ILLINOIS, A CORPORATION OF ILLINOIS.

BOAT STEERING AND PROPELLING DEVICE.

1,021,408.	Specification of Letters Patent.	Patented Mar. 26, 1912.

Application filed July 17, 1911. Serial No. 638,823.

*To all whom it may concern:*

Be it known that I, JULIUS E. HASCHKE, a citizen of the United States, residing at Chicago, in the county of Cook and State of Illinois, have invented certain new and useful Improvements in Boat Steering and Propelling Devices, of which the following is a specification.

My invention relates to improvements in boat steering and propelling devices, and has especial reference to that class of propelling devices that may be quickly and conveniently attached to a boat and as readily removed therefrom, so that the propelling mechanism may be housed and protected without the necessity of protecting the entire boat.

Another object of my invention is to generally improve structures of this character. Other and further objects will become apparent to persons skilled in the art from a consideration of the hereinafter contained description, taken in conjunction with the drawing, wherein—

Figure 1 is an elevation of the device, showing its manner of connection to a boat; Fig. 2 is an enlarged complete elevation of the device, partly in section; Fig. 3 is a transverse section on line 3—3 of Fig. 2; and Fig. 4 is a fragmentary sectional view on line 4—4 of Fig. 2.

In all of the views, the same reference characters indicate similar parts.

In the exemplification selected to disclose my invention, a propeller 10 consists of a conical hollow hub 11, having attached, at opposite diameters, helical propeller blades, 12 and 13. The hub is provided with an internal bored boss 14, slotted for engagement with the two radial pins 15 and 16, that project from the rotary sleeve 17, so that the propeller may be slipped over said sleeve to the position shown in Fig. 2, for rotation therewith. On the inner end of the sleeve 17 is secured a worm wheel 18, which has rotary engagement with the worm 19.

An open end worm housing 20, provides a bearing 21 for the vertically disposed shaft 22, upon the lower end of which the worm is secured. This shaft is provided with a step bearing in the housing 20 as at 23.

Secured firmly in the side wall 20' of the housing 20 is a stud bolt 25 upon which the sleeve 17 and its attached propeller freely rotate. A disk 26, carrying a hub 27, is secured in the open end of the housing 20, and affords a bearing for the sleeve 17. The propeller 10 and sleeve 17 are held on the stud bolt 25 by the nut 28'. Now, it is apparent that when the worm 19 is rotated, the worm wheel, sleeve, and propeller will be also rotated, but at a fewer number of revolutions within a given time.

A casing or tube 29 is secured to the bearing lug 21 in any suitable manner, and at its upper end it is secured to the housing 30 of an electric motor, as by a screw 31, or other desirable means. The shaft 22 is secured to the armature shaft 32, by a coupling 33, so that when the armature shaft is rotated, the propeller will be revolved in like manner but at a slower velocity. As small electric motors operate at relatively high R. P. M. compared to boat propellers, this means, aside from furnishing a desirable connection between the two angular shafts, affords a compact and convenient reduction gear.

It will be observed that the axis of the propeller is at one side of the axis of the vertical shaft. This arrangement, I have found in practice to be of no disadvantage, but, on the contrary, contributes to the efficiency of operation of the device, as it impedes, to some extent, the bodily rotation of the column of water near the axis of the propeller.

A collar 34 fits loosely around the jacket 29 and is provided with a slotted, radially extending, blade 35, to which a clamp 36 is attached, as by bolts 37 and 38, the latter taking through the slot and terminating in a butterfly end 39 for hand manipulation. By this means the angular rotation of the clamp 36 and the jacket 29 may be easily varied. The clamp 36 is provided with two screws 40—40 for securing the device to a boat 41. A split collar 42 is adapted for sliding engagement on the jacket 29, and serves as a rest for supporting the motor and propeller on the collar 34. The collar 42 may be moved to any selected position, on the jacket 29, to adjust the depth of the propeller in the water, and then secured by screw 43.

A wheel, or disk, 44, preferably of electrically insulating material, such as wood, vulcanized fiber, or the like, is secured to the housing 30 of the motor, and is a means by which the device may be bodily rotated in the clamp collar 34, and by which the boat may be steered.

In practice, I find that, when the propeller is rotated, so that its axis is at an angle to the longitudinal axis of the boat, the course of the boat will be thus changed and that the propeller will remain in position in which it has been thus placed until again moved by application to the steering wheel.

The electric terminals of the motor, 45 and 46, are secured to and supported on the steering wheel 44. To these terminals may be connected the source of electric energy, such as a storage battery, which may be placed under the seats of the boat.

An electric snap switch 47, for conveniently disconnecting the motor from the source of electric energy is preferably mounted on the steering wheel 44 concentric with the axis thereof.

Having described a single embodiment of my invention, what I claim is:

1. In a device of the character described, a motor having a housing and a vertical drive shaft, said motor housing providing a jacket-attaching part concentric with said shaft, a propeller structure having a gear and a housing therefor, said gear-housing providing a jacket-attaching part, a vertical shaft at one end engaging said vertical motor shaft and at the other end having a worm engaging said propeller gear, a jacket surrounding said vertical shaft, engaging said jacket-attaching portions of the motor and gear housings, and supporting said motor and propeller; and a clamp for detachable engagement of a boat and for adjustable engagement of said jacket to vary the height of said jacket and jacket-carried motor and propeller relative to the boat.

2. In a device of the character described, a motor having a vertical drive shaft, a housing concentric with the axis of said shaft, a hand wheel mounted above said casing concentric with said axis, electric terminals for said motor mounted on the hand wheel, a snap switch for the motor circuit having a casing concentric with said axis and mounted upon the hand wheel, a propeller, gearing associated with said propeller, a housing inclosing the gearing, a jacket concentric with said shaft axis connecting and supporting said motor and propeller parts, a shaft within said jacket at one end having direct connection with said motor shaft and at its other end connected to said gearing, and means for connection between said jacket and a boat, said means being of a character to permit vertical adjustment of said jacket and supported parts relatively to said boat, and permit rotation of said jacket and supported parts relatively to said boat, whereby a person in the boat may rotate said several concentric parts about said shaft axis by means of said hand wheel.

3. In a device of the character described, a motor, a propeller, a substantially vertical jacket connecting and supporting said motor and propeller, a shaft inclosed within said jacket for transmitting power from said motor to said propeller, and adjustable means for attaching said jacket, and parts carried thereby, to a boat; said means comprising a clamping device for detachable engagement of a boat, an adjustable collar slidable upon said jacket, means upon said collar to position it at desired height upon the jacket, a supporting collar loosely surrounding said jacket below the adjustable collar and supporting said jacket for rotation at a height determined by the position of said adjustable collar, pivotal connections between said supporting collar and said clamping device, one of said pivoted parts having a segmental slot and the other a screw member engaging in said slot, whereby said supporting collar and rotatably supported parts may be adjusted and held at desired inclination.

In testimony whereof I hereunto set my hand in the presence of two witnesses.

JULIUS E. HASCHKE.

Witnesses:
Marz F. Allen,
W. Linn Allen.